United States Patent [19]
Luedtke et al.

[11] Patent Number: 5,630,711
[45] Date of Patent: May 20, 1997

[54] PERISTALTIC PUMP HAVING A LOOP-SHAPED TUBE PATH

[75] Inventors: Kenneth Luedtke, Wilmette, Ill.; Gary Pritchard, Rockwall, Tex.; Craig J. Shields, Chicago, Ill.

[73] Assignee: Graymills Corporation, Chicago, Ill.

[21] Appl. No.: 525,394

[22] Filed: Sep. 8, 1995

[51] Int. Cl.⁶ .................................................. F04B 43/09
[52] U.S. Cl. ................................ 417/477.9; 417/477.1
[58] Field of Search ........................ 417/477.1, 477.9, 417/477.12, 476, 474–477.14; 604/153

[56] References Cited

U.S. PATENT DOCUMENTS

| | | | |
|---|---|---|---|
| 819,690 | 5/1906 | Bryson | 417/476 |
| 2,414,355 | 1/1947 | Bogoslowsky | 417/476 |
| 2,826,993 | 3/1958 | McChesney | 417/476 |
| 3,353,491 | 11/1967 | Bastian | 417/477.9 |
| 3,597,124 | 8/1971 | Adams | 417/477 |
| 3,674,383 | 7/1972 | Iles | 417/476 |
| 4,138,205 | 2/1979 | Wallach | 417/360 |
| 4,155,362 | 5/1979 | Jess | 128/214 F |
| 4,187,057 | 2/1980 | Xanthopoulos | 417/63 |
| 4,205,948 | 6/1980 | Jones | 417/477.6 |
| 4,210,138 | 7/1980 | Jess et al. | 128/214 E |
| 4,211,519 | 7/1980 | Hogan | 417/360 |
| 4,256,442 | 3/1981 | Lamadrid et al. | 417/477 |
| 4,315,718 | 2/1982 | Hogan | 417/477 |
| 4,371,321 | 2/1983 | Koblo et al. | 417/476 |
| 4,417,856 | 11/1983 | Minissian | 417/477 |
| 4,512,726 | 4/1985 | Strimling | 417/477.5 |
| 4,515,584 | 5/1985 | Abe et al. | 604/66 |
| 4,558,996 | 12/1985 | Becker | 417/374 |
| 4,559,040 | 12/1985 | Horres et al. | 604/153 |
| 4,631,008 | 12/1986 | Stenner | 417/477 |
| 4,813,855 | 3/1989 | Leeven et al. | 417/477 |
| 4,886,431 | 12/1989 | Soderquist et al. | 417/477 |
| 4,925,376 | 5/1990 | Kahler | 417/477 |
| 4,976,590 | 12/1990 | Baldwin | 417/53 |
| 5,082,429 | 1/1992 | Soderquist et al. | 417/477 |
| 5,096,393 | 3/1992 | Van Steenderen et al. | 417/477 |
| 5,380,173 | 1/1995 | Hellstrom | 417/477.3 |

*Primary Examiner*—Timothy Thorpe
*Assistant Examiner*—Peter G. Korytnyk
*Attorney, Agent, or Firm*—Marshall, O'Toole, Gerstein, Murray & Borun

[57] ABSTRACT

A peristaltic pump for transferring fluid through a flexible tube having a loop-shaped tube path is provided. The pump includes a motor that drives a pair of rollers in a circular path within a housing. The housing includes identical housing halves that together define an inlet port, an outlet port and the loop-shaped tube path through which the flexible tube is fed.

12 Claims, 4 Drawing Sheets

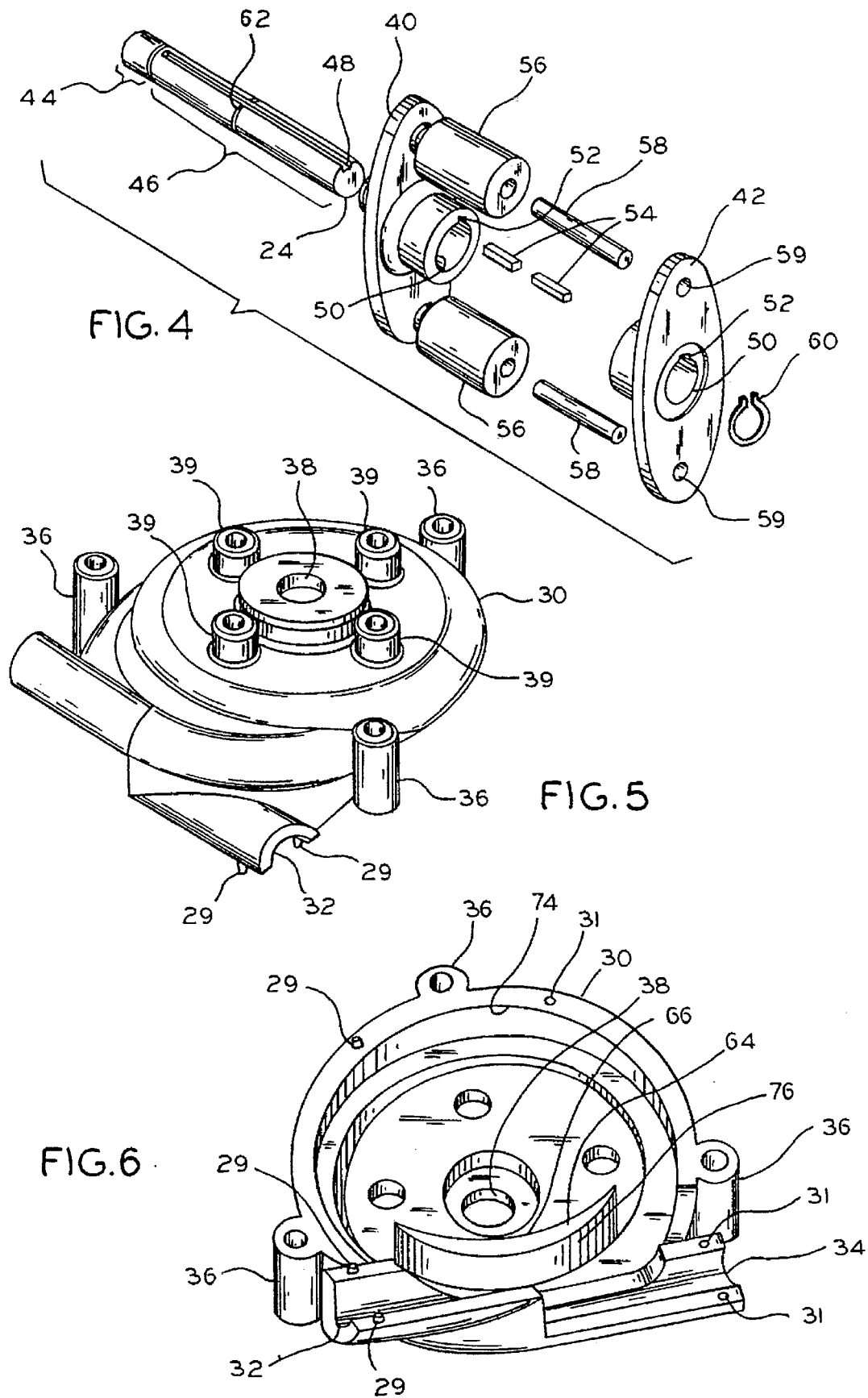

PERISTALTIC PUMP HAVING A LOOP-SHAPED TUBE PATH

TECHNICAL FIELD

The present invention relates to fluid pumps in general, and more specifically to peristaltic pumps.

BACKGROUND ART

Peristaltic pumps are well-known devices which transfer fluid through an elongate flexible tube by compressing a portion of the tube, and pushing the fluid through the tube using such compression. Peristaltic pumps are commonly used for transferring fluids such as ink for printing or for transferring fluids such as blood in medical equipment. Peristaltic pumps may also be used to transfer fluids such as cleaning agents, coolants, slurries or liquid adhesives, just to name a few of the many fluids that can be transferred with such pumps. One advantageous feature of peristaltic pumps is that the fluid does not contact the pump mechanism since the fluid is always confined within and moved through the flexible tube. Therefore, peristaltic pumps may be used to transfer corrosive or caustic solutions or other hazardous fluids without affecting the pump mechanism.

In a typical peristaltic pump, the tube is compressed by one or more rollers that are driven by an electric or air-powered motor. Each roller compresses the tube as it moves along the length of the tube. Also typically, the flexible tube is fed through the pump along a generally U-shaped path or alternatively along a substantially straight arc-shaped path (in the case of a pass-through pump) so that the U-shaped or arc-shaped portion of the tube overlaps a portion of a path traveled by the rollers. Such arrangements have numerous disadvantages. For example, the tube can undesirably creep through the pump during operation of the pump, requiring either periodic adjustment of the tube, or a separate clamping device to prevent such creep of the tube. A U-shaped or substantially straight arc-shaped tube path in a peristaltic pump provides a small contact area between the pump rollers and the tube, as the rollers are only in contact with the tube over a small portion of the overall path of travel of the rollers. As a result, depending on the flow rate requirements imposed on the pump, there can be substantial fatigue imposed on the tube. The use of additional rollers may partially correct this problem, but causes additional wear on the tube and adds cost and complexity to the pump.

In many peristaltic pumps using a U-shaped tube path, the flexible tube is oriented such that the fluid flowing into the pump flows in a direction opposite to that of the fluid flowing out of the pump. In such an arrangement, additional space and tube length is required if the pump is to be disposed along a line leading from the source of fluid directly to the destination to which the fluid is being pumped, as the tube must turn 90° to enter the pump and the tube must also turn 90° to exit the pump. As will be appreciated, these turns could also cause kinking of the flexible tube that would either interrupt or at least interfere with the free flow of fluid. Such kinking is highly undesirable and could be dangerous in some applications.

The housing of a typical peristaltic pump as well as the components located within the housing can be complex and expensive to manufacture, especially if a large number of rollers are used in the pump. Therefore, there is a need for a peristaltic pump that is economical to manufacture, durable, compact and capable of reliably and efficiently pumping fluid.

SUMMARY OF THE INVENTION

In accordance with the present invention, a housing for a peristaltic pump is provided, having an inlet port, an outlet port and a loop-shaped tube path within the housing. Preferably the loop-shaped tube path includes means for orienting a flexible tube to have parallel portions between the inlet port and the outlet port. Also preferably, the tube orienting means includes a crescent-shaped guide block located in the interior of the housing generally intermediate the inlet port and the outlet port.

In an exemplary embodiment, the loop-shaped tube path is defined by a substantially circular wall portion of the interior of the housing that causes the flexible tube to be disposed in a complete loop within the housing. An outwardly facing surface of the guide block defines a tube path segment which comprises a first perimeter portion of the loop-shaped tube path. A second perimeter portion of the loop-shaped tube path is defined by the substantially circular wall portion that is perimetrically spaced from the first perimeter portion of the loop-shaped tube path. The first perimeter portion of the loop-shaped tube path may be disposed radially outwardly of the second perimeter portion of the loop-shaped tube path such that the tube path is generally elliptical.

In the preferred embodiment, the inlet port and the outlet port are oppositely facing along parallel axes generally tangential to the loop-shaped tube path. In addition, the housing preferably comprises a pair of identical housing halves, made from a translucent or opaque material such as LEXAN® polycarbonate material, available from the General Electric Company, 3135 Easton Turnpike, Fairfield, Conn. 06431.

According to another aspect of the present invention, a peristaltic pump for moving a fluid through a flexible tube comprises a housing, a main drive shaft mounted for rotation within the housing, and a rotor driven by the main drive shaft within the housing. At least one roller shaft is attached to the rotor and a roller is rotatably mounted on each roller shaft. The housing includes an inlet port, an outlet port, and a loop-shaped tube path joining the inlet port to the outlet port and generally surrounding a circular rotational path of the roller or rollers.

The peristaltic pump constructed in accordance with the present invention provides a compact, efficient, and durable mechanism for transferring fluid through a flexible tube. The loop-shaped tube path provides roller contact with the tube over a large portion of the roller path, thereby permitting the use of only two rollers and minimizing wear on the tube. The loop-shaped tube path also allows the pump to be disposed between a fluid source and a fluid destination along a substantially straight line, while minimizing space, tube length requirements, and the possibility of tube kinking. In addition, the parallel portions of the tube are pressed against one another so as to be in frictional contact within the housing thereby reducing or eliminating the tendency of the tube to creep through the housing.

Other advantages and features of the present invention will become apparent from a consideration of the following specification taken in conjunction with the accompanying drawings.

BRIEF DESCRIPTION OF THE DRAWINGS

FIG. 4 is an exploded perspective view illustrating components of the peristaltic pump of FIG. 1;

FIG. 5 is a perspective view illustrating the exterior of the housing half shown in FIG. 3;

FIG. 6 is a perspective view illustrating the interior of the housing half of FIG. 3;

DESCRIPTION OF THE PREFERRED EMBODIMENTS

Figure 1:
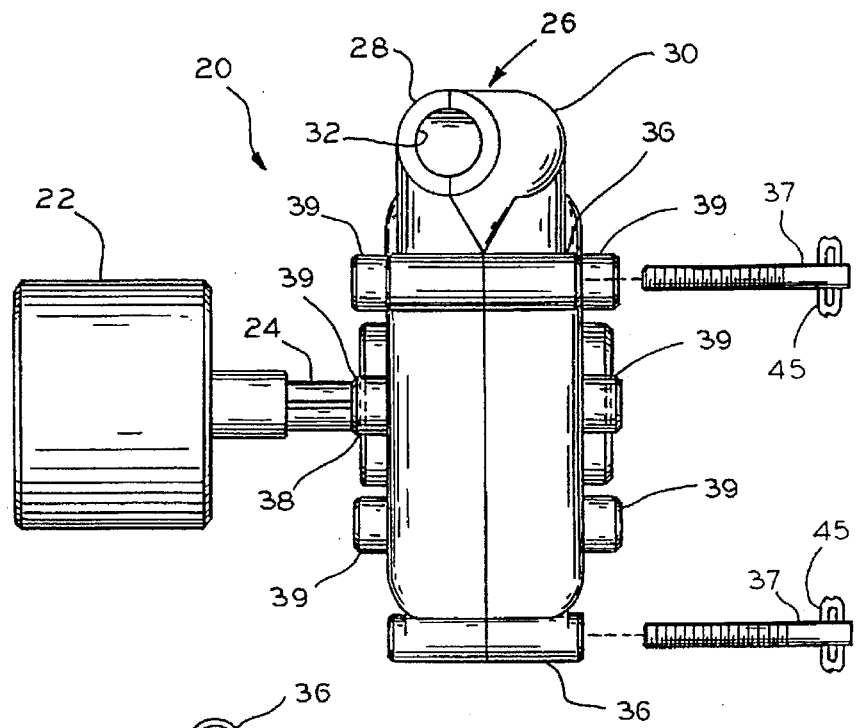
FIG. 1 is a side elevational view of a peristaltic pump constructed in accordance with the present invention.
Figure 2:
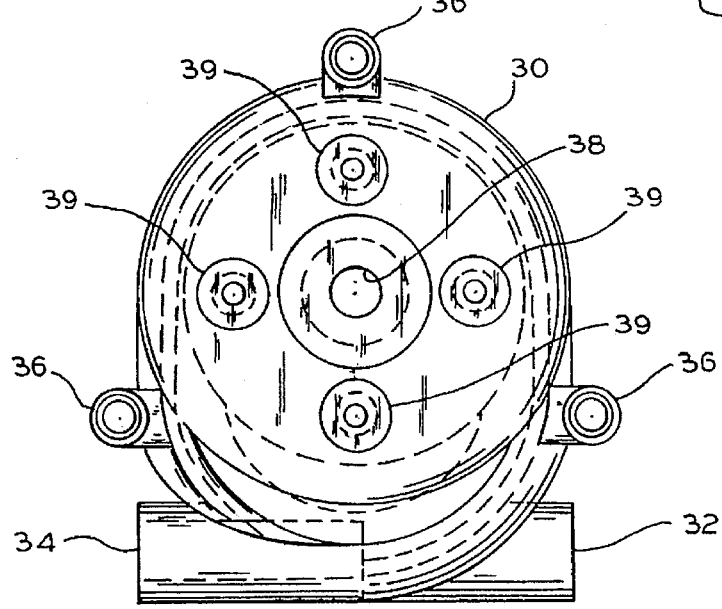
FIG. 2 is an inverted front elevational view of the peristaltic pump of FIG. 1.
Figure 3:
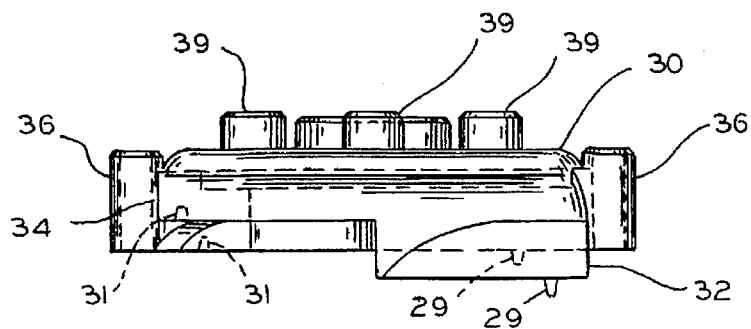
FIG. 3 is a rotated side elevational view of a half of a housing for the peristaltic pump of FIG. 1.

Initially referring to FIG. 1, a peristaltic pump, shown generally at 20, comprises a motor 22 that rotates a drive shaft 24 disposed between the motor 22 and a pump housing shown generally at 26. The motor 22 is of a conventional design and may be, for example, electrically driven or pneumatically driven. The pump housing 26 comprises first and second identical housing halves 28, 30 that form an inlet port 32 and an outlet port 34 (not shown in FIG. 1). The housing halves 28, 30 are preferably translucent so that operation of the peristaltic pump 20 may be visually monitored. Preferably, each of the housing halves 28, 30 are constructed of LEXAN® polycarbonate material.

As best seen in FIG. 6, each of the housing halves 28, 30 includes three guide posts 29 and three guide holes 31. The guide posts 29 and guide holes 31 on the first housing half 28 mate with the corresponding guide holes 31 and guide posts 29, respectively, on the second housing half 30. Thus, the guide posts 29 and guide holes 31 serve to ensure proper alignment when the housing halves are joined together to form the housing 26.

Figure 10:
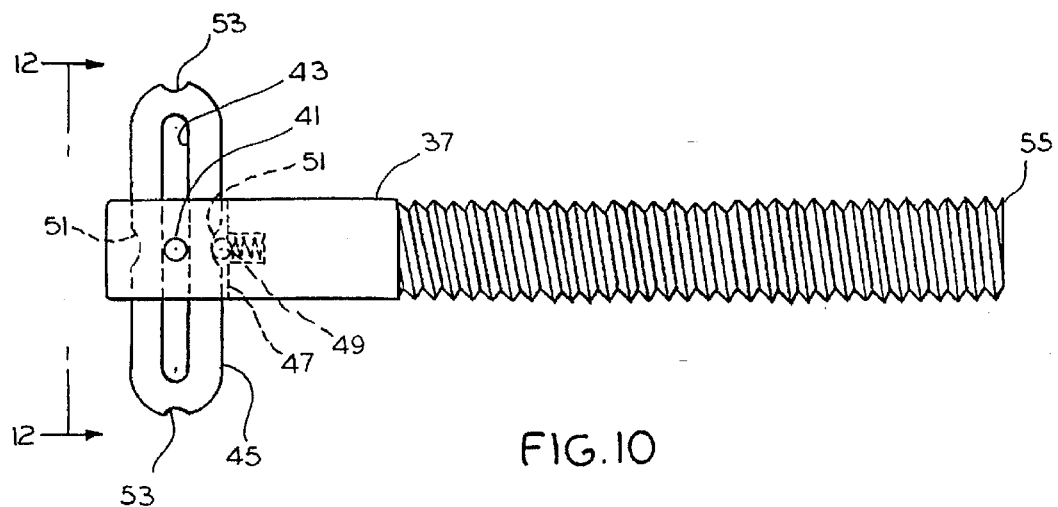
FIG. 10 is an elevational view of a quick release attachment bolt for the peristaltic pump of FIG. 1, shown in a locking configuration.
Figure 11:
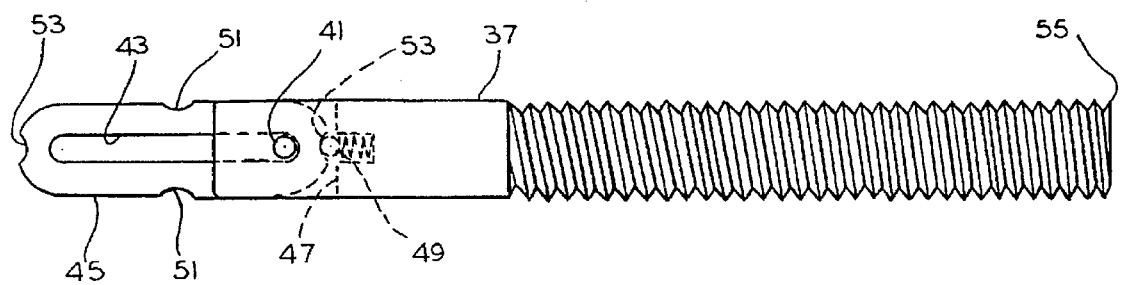
FIG. 11 is an elevational view of the quick release attachment bolt of FIG. 10, shown in a releasing configuration.
Figure 12:
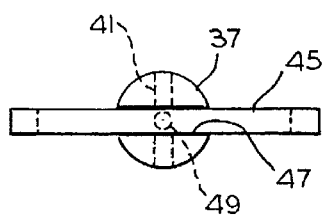
FIG. 12 is an elevational view taken along line 12—12 of FIG. 10.

Again referring to FIG. 1, each housing half 28, 30 includes lugs 36 through which quick release attachment bolts 37 pass. As seen in FIGS. 10–12, each bolt 37 includes a transverse pin 41 disposed within a slot 47 in the bolt 37. A release/lock plate 45 is partially disposed in the slot 47 in the bolt 37 and engages the transverse pin 41 such that the transverse pin 41 passes through a slot 43 in the release/lock plate 45. Each bolt 37 and release/lock plate 45 may be constructed of any suitable material, such as steel. The release/lock plate 45 includes lock detents 51 and release detents 53. When the release/lock plate 45 is in a locking position, as shown in FIG. 10, one of the lock detents 51 releasably engages a ball-spring mechanism 49, and the slot 43 in the release/lock plate 45 is oriented in a direction perpendicular to the bolt 37. When the release/lock plate 45 is in a releasing position, as shown in FIG. 11, one of the release detents 53 releasably engages the ball-spring mechanism 49, and the slot 43 in the release/lock plate 45 is oriented in a direction parallel to the bolt 37.

In order to secure the housing halves 28, 30 together, a threaded end 55 of each bolt 37 engages threads (not shown) in each lug 36 on the first housing half 28 and the release/lock plate 45 is placed in the releasing position. The second housing half 30 is mated with the first housing half 28 such that the bolts 37 pass through the lugs 36 on the second housing half 30. Next, the bolts 37 are tightened until the release/lock plates 45 contact the lugs 36 on the second housing half 30. To remove the second housing half 30, the bolts 37 need be rotated only about one-quarter to one-half turn in order to allow the user to pivot the release/lock plate 45 into the releasing position. Alternatively, to clamp the housing halves 28, 30 together, each bolt 37 may extend through each lug 36 of both housing halves 28, 30 and a nut (not shown) may be used to secure each bolt 37.

Each housing half 28, 30 also includes a central bore 38, through which the drive shaft 24 passes, as well as four cylindrical bosses 39, which may be used for mounting the pump housing 26 to a support structure (not shown).

Figure 7:
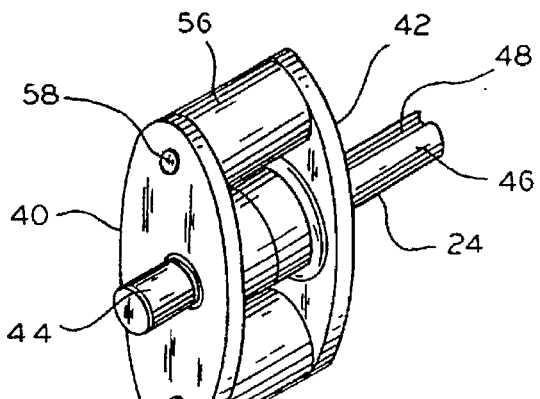
FIG. 7 is a perspective view illustrating the components shown in FIG. 4, in an assembled state.

As shown in FIGS. 4 and 7, the drive shaft 24 is attached to a pair of axially spaced rotors 40, 42, each preferably constructed of a polycarbonate/polyester blend material or alternatively constructed of a nylon material. The drive shaft 24 includes an enlarged head portion 44 and a slotted portion 46. The enlarged head portion 44 has a diameter slightly larger than that of the slotted portion 46. The slotted portion 46 includes an axial slot 48 disposed along the length of the slotted portion 46. Each rotor 40, 42 includes a notched hole 50 having an axial notch 52 extending radially beyond the diameter of the notched hole 50 along the axis thereof. Keys 54 fit within the axial notches 52 and the axial slot 48 to prevent relative rotation between the drive shaft 24 and the rotors 40, 42.

A pair of rollers 56 are each rotatably mounted on a roller shaft 58 that is press fit into holes 59 at either end of each rotor 40, 42 and thereby secured between each rotor 40, 42. The rollers 56 may be constructed of any suitable material. Preferably, the rollers 56 are constructed of a self-lubricating material such as one of the following materials: Vespel® SP21 material, available from E. I. DuPont De Nemours and Company Inc., 1007 Market Street, Wilmington, Del. 19898; HYDLAR®-Z, available from A. L. Hyde Company, Grenloch, N.J. (a composite material with KEVLAR® fibers, available from E. I. DuPont De Nemours and Company at the aforementioned address, embedded in a nylon matrix); NYLATRON®, available from Polymer Corporation, 2120 Fairmont Avenue, Reading, Pa. 19605; MDS-filled nylon 6/6; graphite impregnated nylon; or nylon impregnated with TEFLON®, available from E. I. DuPont De Nemours and Company at the aforementioned address. Alternatively, separate bearings (not shown) may be mounted between each roller 56 and roller shaft 58.

A snap ring 60 engages a circumferential groove 62 in the drive shaft 24 to prevent axial movement of the rotors 40, 42 with respect to the drive shaft 24. The drive shaft 24 and roller shafts 58 are preferably constructed from 316 stainless steel.

As best seen in FIG. 6, each housing half 28, 30 includes a crescent shaped guide block 64 disposed on the interior portion of the housing half 28, 30. An inwardly facing cylindrical surface 66 of the guide block 64 defines a first perimeter portion of a rotational path of the rollers 56.

Figure 8:
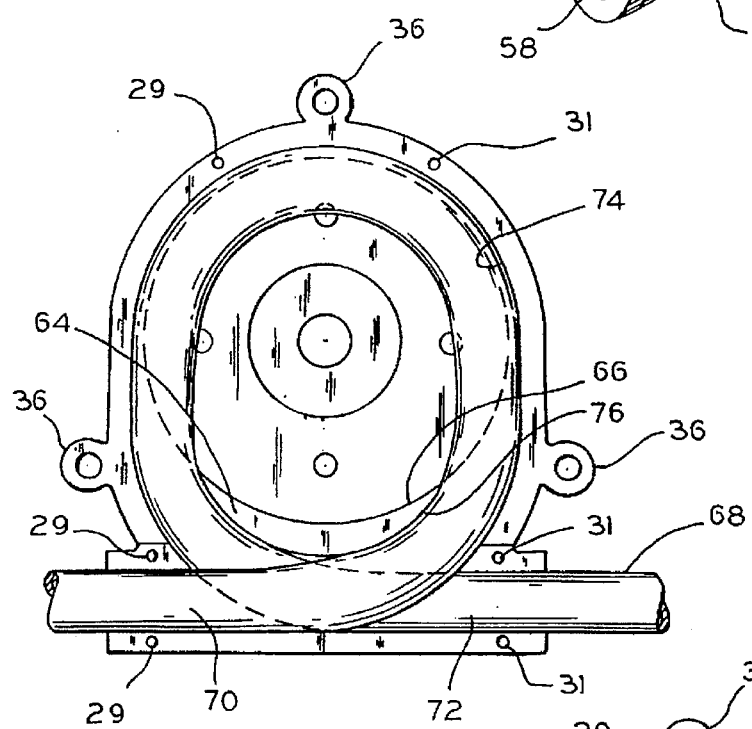
FIG. 8 is an elevational view showing the interior of the housing half of FIG. 3 with a flexible tube installed therein.
Figure 9:
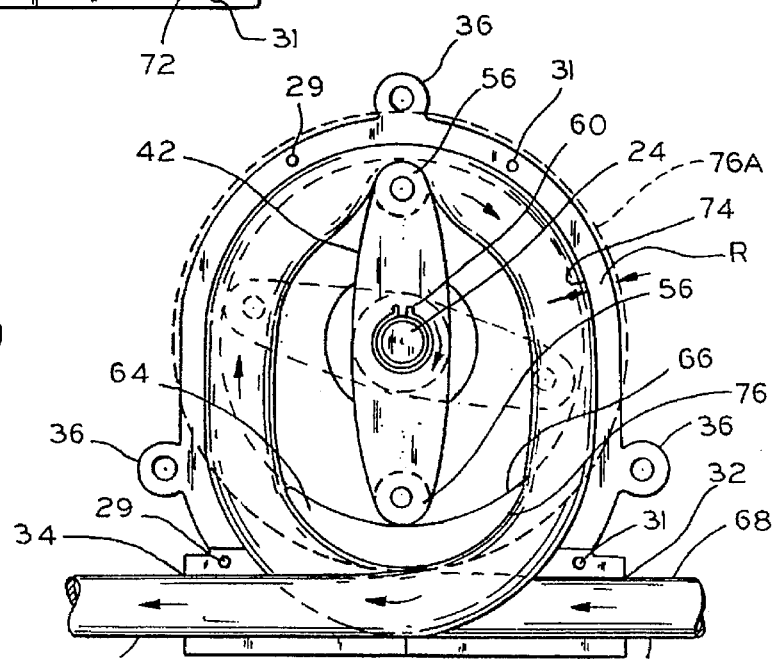
FIG. 9 is an elevational view of the interior of the housing half of FIG. 3 with a flexible tube installed therein and showing the components of FIG. 7 installed therein.

A flexible tube 68 is fed through the housing 26 in a loop-shaped path, as shown in FIGS. 8 and 9. As shown by the arrows in FIG. 9, the rotors 40, 42 rotate in a clockwise direction and the rollers 56 compress the flexible tubing 68 thereby causing fluid within the tubing 68 to flow in a clockwise direction through the loop-shaped path. As seen in FIGS. 8 and 9, the tube 68 is disposed within the housing 26 such that first and second parallel portions 70, 72 overlap with one another in a region adjacent to the guide block 64 and approximately midway between the inlet port 32 and the outlet port 34. In the region where the parallel portions 70, 72 overlap, the tube 68 is slightly compressed, such that the portions 70 and 72 are in forced frictional engagement with one another and with the housing halves 28 and 30, so as to be effectively clamped within the housing 26 in order to prevent the tube 68 from creeping through the housing 26 during operation of the peristaltic pump 20. The tube 68 is clamped tightly enough so as to prevent creep but not to an extent that would compress the tube 68 so as to unduly restrict the free flow of fluid though the tube 68 in the region where the parallel portions 70, 72 overlap.

A substantially circular wall portion 74 of the housing 26, best seen in FIG. 6, defines the loop-shaped tube path followed by the tube 68 within the housing 26. An outwardly facing surface 76 of the guide block 64 defines a segment of the loop-shaped tube path comprising a first perimeter portion thereof. The substantially circular wall portion 74, perimetrically spaced from the first perimeter portion of the tube path, defines a second perimeter portion of the loop-shaped tube path. The first perimeter portion of the tube path, defined by the outwardly facing surface 76, is disposed radially outwardly of the second perimeter portion of the tube path, defined by the substantially circular wall portion 74, such that the tube 68 follows a generally elliptical path. The outwardly radial spacing, R (FIG. 9), between the first and second perimeter portions of the loop-shaped tube path is the distance between the substantially circular wall portion 74 and a dashed circle 76A having the same radius as that of the outwardly facing surface 76.

As seen in FIG. 9, the tube 68 is compressed by the rollers 56 against the substantially circular wall portion 74 substantially throughout the circular rotation path of the rollers 56, except for in the first perimeter portion of the rotation path, in the limited region of the inwardly facing cylindrical surface 66 of the guide block 64.

To set up the peristaltic pump 20, the user removes the second housing half 30 and places the tube 68 in the first housing half 28 so that the tube 68 follows a loop-shaped path following the substantially circular wall portion 74 and passes around the outwardly facing surface 76 of the guide block 64. Once the tube 68 is properly placed in the first housing half 28, the second housing half 30 is mated with the first housing half 28 using the guide posts 29 and guide holes 31 and is clamped into position with the quick release attachment bolts 37. Thereafter, the pump 20 may be operated simply by activating the motor 22 and the direction of fluid flow may be reversed by reversing the direction in which the drive shaft 24 rotates.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A housing for a peristaltic pump for moving a fluid through a flexible tube, comprising:

an inlet port, an outlet port, and a loop-shaped tube path within said housing joining said inlet port to said outlet port;

said loop-shaped tube path including means for orienting said flexible tube to have parallel portions between said inlet port and said outlet port; and said tube orienting means including a guide block for guiding said flexible tube located in the interior of said housing generally intermediate said inlet port and said outlet port.

2. The housing for a peristaltic pump as recited in claim 1 wherein said loop-shaped tube path is defined by a substantially circular wall portion of the interior of said housing to cause said flexible tube to be disposed in a complete loop therewithin.

3. The housing for a peristaltic pump as recited in claim 2 wherein an outwardly facing surface of said guide block defines a tube path segment which comprises a first perimeter portion of said loop-shaped tube path.

4. The housing for a peristaltic pump as recited in claim 3 wherein a second perimeter portion of said loop-shaped tube path is defined by said substantially circular wall portion perimetrically spaced from said first perimeter portion of said loop-shaped tube path.

5. The housing for a peristaltic pump as recited in claim 4 wherein said first perimeter portion of said loop-shaped tube path is disposed radially outwardly of said second perimeter portion of said loop-shaped tube path such that said tube path is generally elliptical.

6. A housing for a peristaltic pump for moving a fluid through a flexible tube, comprising:

an inlet port, an outlet port, and a loop-shaped tube path within said housing joining said inlet port to said outlet port;

said housing comprising a pair of identical mating housing halves, each housing half including means integrally associated therewith for aligning said housing halves to form said housing.

7. A peristaltic pump for moving a fluid through a flexible tube, comprising:

a housing;

a main drive shaft mounted for rotation within said housing;

a rotor driven by said main drive shaft within said housing, said rotor having at least one roller shaft attached to said rotor, and including a roller rotatably mounted on said roller shaft;

wherein said housing comprises:

an inlet port;

an outlet port;

a loop-shaped tube path joining said inlet port to said outlet port and generally surrounding a circular rotational path of said roller;

said loop-shaped tube path including means for orienting said flexible tube to have parallel portions between said inlet port and said outlet port: and said tube orienting means including a guide block located in the interior of said housing between said flexible tube and said circular rotational path of said roller at a point generally intermediate said inlet port and said outlet port.

8. The peristaltic pump as recited in claim 7 wherein a surface of said guide block defines a segment of a circular cylinder which defines a first perimeter portion of said rotational path of said roller.

9. The peristaltic pump as recited in claim 8 wherein a second perimeter portion of said rotational path of said roller is defined by a substantially circular wall radially coextensive with said first perimeter portion of said rotational path of said roller defined by said circular cylinder segment.

10. The peristaltic pump as recited in claim 8 wherein said tube is compressed between said roller and said housing substantially throughout said rotational path except for in said first perimeter portion of said rotational path.

11. A peristaltic pump for moving a fluid through a flexible tube, comprising:

a housing;

a main drive shaft mounted for rotation within said housing;

a pair of axially spaced rotors driven by said drive shaft;

a pair of roller shafts disposed between and mounted to each of said rotors at a point radially outwardly of said drive shaft; and a pair of rollers each rotatably mounted on one of said roller shafts;

wherein said housing comprises:
   an inlet port;
   an outlet port; and
   a loop-shaped tube path joining said inlet port to said outlet port and surrounding a generally circular rotational path of said rollers;

and wherein said housing includes a guide block located in the interior of said housing between said flexible tube and said circular rotational path of said roller at a point adjacent to overlapping portions of said flexible tube.

12. The housing for a peristaltic pump as recited in claim 1 wherein said guide block is crescent-shaped.

* * * * *